(12) United States Patent
Obrecht

(10) Patent No.: US 10,335,907 B2
(45) Date of Patent: Jul. 2, 2019

(54) METHOD AND APPARATUS FOR INSTALLING PIERCE NUTS

(71) Applicant: REO Hydro-Pierce, Inc., Detroit, MI (US)

(72) Inventor: Robert E. Obrecht, Lauderdale-By-The-Sea, FL (US)

(73) Assignee: REO Hydro-Pierce, Inc., Detroit, MI (US)

( * ) Notice: Subject to any disclaimer, the term of this patent is extended or adjusted under 35 U.S.C. 154(b) by 413 days.

(21) Appl. No.: 15/155,521

(22) Filed: May 16, 2016

(65) Prior Publication Data

US 2016/0339549 A1    Nov. 24, 2016

Related U.S. Application Data

(60) Provisional application No. 62/163,068, filed on May 18, 2015.

(51) Int. Cl.
*B23P 19/06* (2006.01)
*F16B 37/06* (2006.01)

(52) U.S. Cl.
CPC ........... *B23P 19/062* (2013.01); *B23P 19/064* (2013.01); *F16B 37/062* (2013.01)

(58) Field of Classification Search
CPC ...... B23P 19/062; B23P 19/064; F16B 37/062
See application file for complete search history.

(56) References Cited

U.S. PATENT DOCUMENTS

| | | |
|---|---|---|
| 3,108,368 A | 10/1963 | Steward |
| 3,857,602 A | 12/1974 | Karkau et al. |
| 4,716,803 A | 1/1988 | Waltonen |
| 4,905,362 A | 3/1990 | Obrecht et al. |
| 4,959,989 A | 10/1990 | Obrecht et al. |
| 5,054,305 A | 10/1991 | Obrecht et al. |
| RE33,798 E | 1/1992 | Waltonen |
| 5,259,102 A | 11/1993 | Obrecht |
| 5,297,382 A | 3/1994 | Waltonen et al. |
| 5,299,489 A | 4/1994 | Obrecht et al. |
| 5,427,349 A | 6/1995 | Obrecht |
| RE35,907 E | 9/1998 | Obrecht |
| 5,899,110 A | 5/1999 | Obrecht |
| 6,018,863 A | 2/2000 | Altrock |
| 6,108,893 A | 8/2000 | Wojciechowski et al. |
| 6,122,816 A | 9/2000 | Ladouceur |
| 6,164,489 A | 12/2000 | Altrock |
| 6,226,854 B1 | 5/2001 | Ladouceur et al. |
| 6,406,237 B1 | 6/2002 | Wojciechowski et al. |
| 6,418,609 B1 | 7/2002 | Wojciechowski et al. |
| 6,442,830 B1 | 9/2002 | Vrana |
| 6,491,487 B1 | 12/2002 | Wojciechowski |
| RE38,061 E | 4/2003 | Ladouceur |
| 6,592,311 B2 | 7/2003 | Wojciechowski et al. |
| 6,631,827 B2 | 10/2003 | Goodsmith et al. |

(Continued)

*Primary Examiner* — John C Hong
(74) *Attorney, Agent, or Firm* — Young Basile Hanlon & MacFarlane, P.C.

(57) ABSTRACT

A gag bar with a cam surface is used to reciprocate a kicker pin in a ram-driven punch assembly into the bore of a pierce nut in a pre-mounting position. The kicker pin and punch assembly are thereafter driven toward a workpiece to install the pierce nut in the workpiece and to fully separate a slug formed during the pierce nut entry from the workpiece. The gag bar and punch are thereafter reciprocated to allow the next pierce nut to be put in position.

10 Claims, 9 Drawing Sheets

(56) References Cited

U.S. PATENT DOCUMENTS

| | | |
|---|---|---|
| 6,647,608 B2 | 11/2003 | Wojciechowski et al. |
| 6,820,327 B2 | 11/2004 | Vrana |
| 6,851,904 B2 | 2/2005 | Parker et al. |
| 6,893,198 B2 | 5/2005 | Couillais et al. |
| 6,912,776 B2 | 7/2005 | Vrana |
| 6,925,698 B2 | 8/2005 | Goodsmith et al. |
| 6,954,976 B2 | 10/2005 | Ladouceur et al. |
| 7,237,996 B2 | 7/2007 | Vrana |
| 7,367,893 B2 | 5/2008 | Vrana et al. |
| 8,136,235 B2 | 3/2012 | Woods |

METHOD AND APPARATUS FOR INSTALLING PIERCE NUTS

CROSS REFERENCE OF CO-PENDING APPLICATION

This application claims priority benefits to the May 18, 2015, filing date of U.S. provisional patent application Ser. No. 62/163,068 for a PIERCE NUT APPARATUS, the entire contents of which are incorporated herein in its entirety.

FIELD OF THE INVENTION

The application relates to fasteners of the type known as pierce nuts and particularly to a method and apparatus for installing pierce nuts in metal workpieces such as but not limited to stampings used as automotive body components.

BACKGROUND

A pierce nut is a female fastener component usually designed to receive a male component such as a threaded bolt to fasten two or more parts of an assembly together. The distinguishing characteristic of a pierce nut is the existence of a pilot collar on one face of the nut that, in the installation process, pierces a workpiece, such as a metal stamping, to remove a slug of material from the part and permanently fastens the nut to the stamping.

FIG. 1 shows a representative pierce nut 10, in this case having an octagonal metal body with peripheral wrenching surfaces 11. A pilot collar 12 of annular configuration extends axially from one face 13 of the nut and is centered around a threaded bore 14. Radial barbs 15 extend from the collar to the outside edges of the face 13.

FIG. 2 shows a typical installation of the pierce nut 10 in a "workpiece" 16 in the form of a metal stamping. The stamping may be steel, aluminum, or any of a variety of metals or other materials. In FIG. 2 the pierce nut 10 is shown in the installed condition wherein the pilot collar 12 has been driven through the workpiece 16 to produce a detached slug 18. In the case where a mating part is joined flush with the top surface of the workpiece 16, the collar may not drive through the workpiece 16 in which case the slug 18 may stay attached to the workpiece 16. The axial depth of the pilot collar is approximately, or less than the thickness of the workpiece which can be about 5.5 mm or less. In the final assembly, the bore 14 can receive a threaded male fastener such as a bolt entering the through bore from the lower side of the pierce nut 10 as shown in FIG. 2.

SUMMARY OF THE INVENTION

According to one aspect of the invention, a method of installing pierce nuts is disclosed. The method includes the steps of:

(a) placing a pierce nut in a device that aligns the nut and its pilot collar with a workpiece installation location;

(b) driving a slug kicker pin into the nut bore using a cam-type gag bar;

(c) driving the nut and kicker pin toward and into the installation location to remove a slug from the workpiece and fully separate the slug from the workpiece; and (d) withdrawing the fixture and kicker pin, leaving the nut permanently attached to the workpiece. This method provides the advantage of ensuring that the slug is removed from the workpiece under all circumstances including the case where the workpiece is placed adjacent a second layer during the installation step.

According to a second aspect of the invention, an apparatus for installing pierce nuts in a workpiece is provided. The apparatus comprises a fixture for receiving and holding a pierce nut in a position aligned with, but spaced from, a workpiece installation position; a slug kicker pin positioned for reciprocal movement to and from a pierce nut bore in the installation position; a gag bar reciprocally actuable to drive the pin to the nut installation position; and a ram for driving the pierce nut and the kicker pin into a workpiece to force the pilot collar of the nut into the workpiece. This action creates a slug of material that is fully removed from the workpiece by the kicker pin under all circumstances.

BRIEF DESCRIPTION OF THE DRAWINGS

The various features, advantages and other uses of the present asset management and control apparatus will become more apparatus referring to the following description and drawing in which.

DETAILED DESCRIPTION

Figure 1:
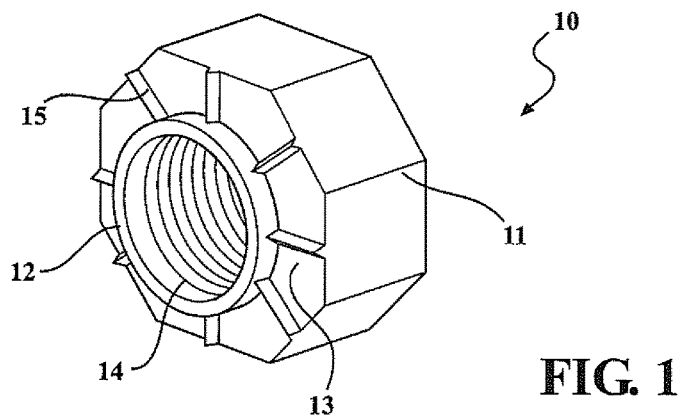
FIG. 1 shows a representative pierce nut.
Figure 2:
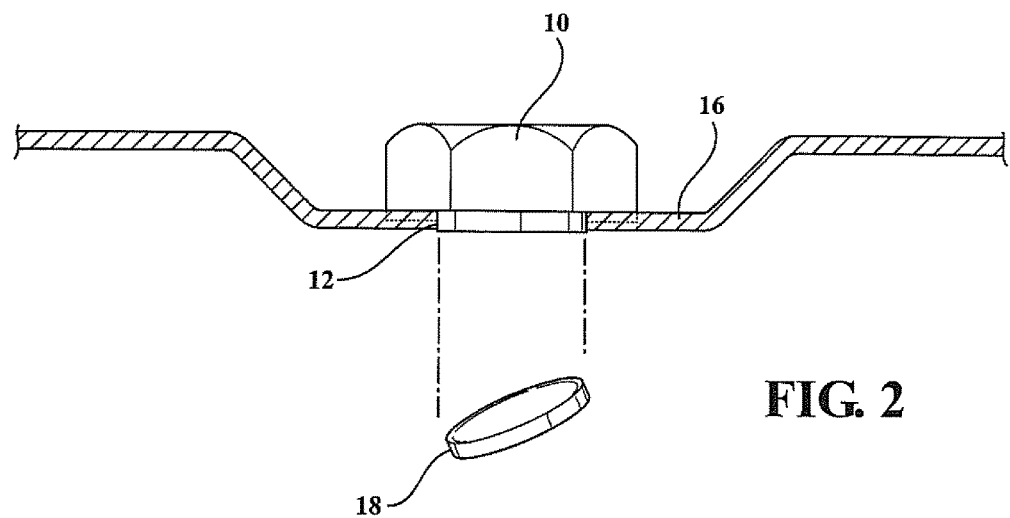
FIG. 2 shows an installed pierce nut.
Figure 3:
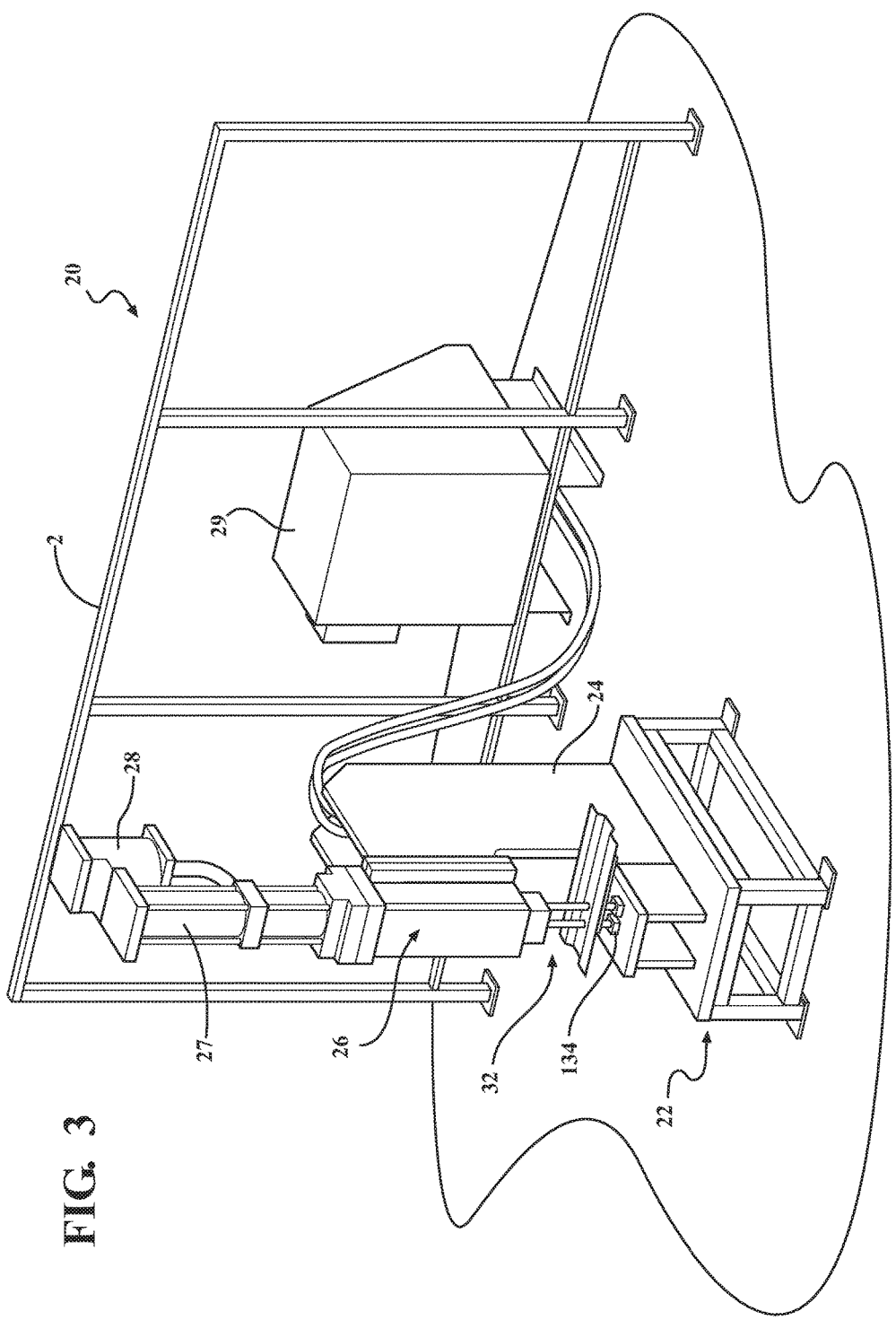
FIG. 3 is a perspective view of a pierce nut installation system.

A pierce nut assembly apparatus 20 is shown in FIG. 3 for installing pierce nuts 10 to a production part or workpiece 16, where the collar of the pierce nut pierces and forms an aperture in the workpiece as described with reference to FIG. 2.

Figure 6:
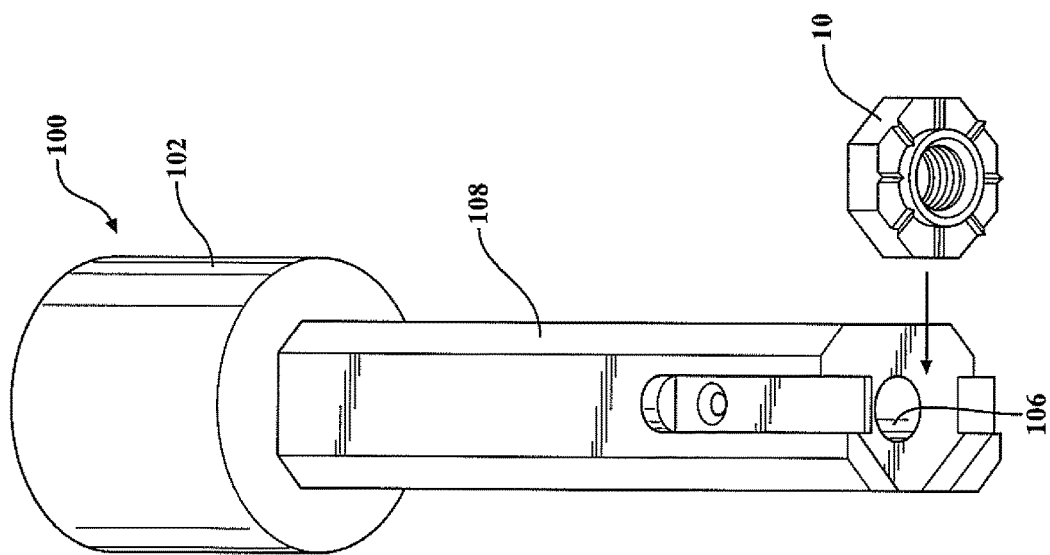
FIG. 6 is a perspective view of the nut punch.

As shown in FIGS. 3, 6 the apparatus 20 includes a stand 22 on which is mounted a die 134. A ram 26 with a suitable actuator 27 is mounted to the support 2 and can reciprocally move up and down for applying downward pressure and force to a pierce nut and pierce nut tool 32.

Fluid pressure is supplied to the ram 26 from an actuator control station 28. A nut feeder 29 is provided to supply the pierce nuts to the pierce nut tool 32 and the pierce head body 50. The ram 26 can also be driven by a servo motor.

The pierce nut tool 32, shown in detail in FIGS. 4-10, is uniquely configured to not only affix the pierce nut 10 the workpiece 16; but to also insure that the slug 18 formed in the process is completely removed.

Figure 4:
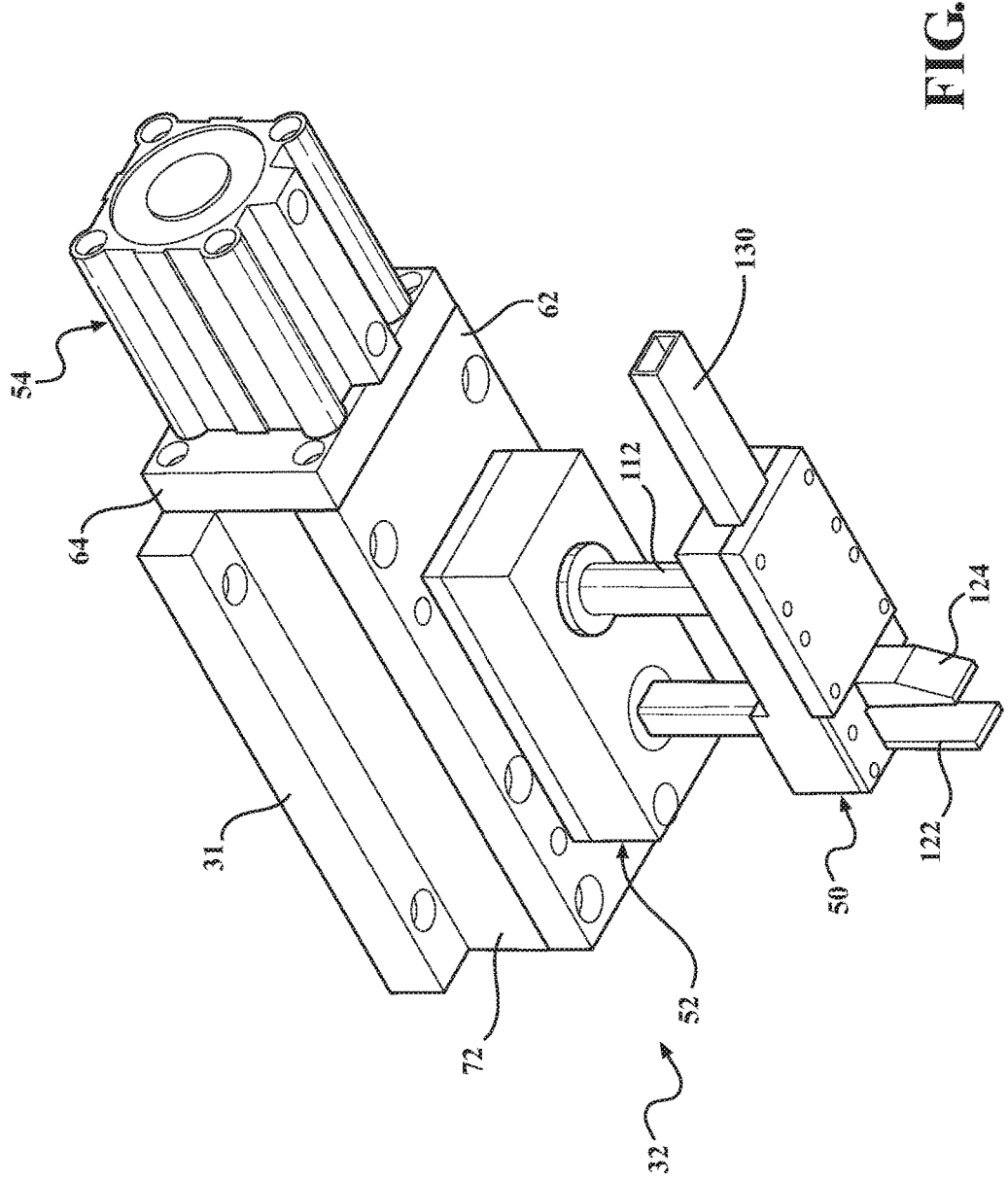
FIG. 4 is a perspective view of a pierce nut installation tool that is part of the system shown in FIG. 3.
Figure 5:
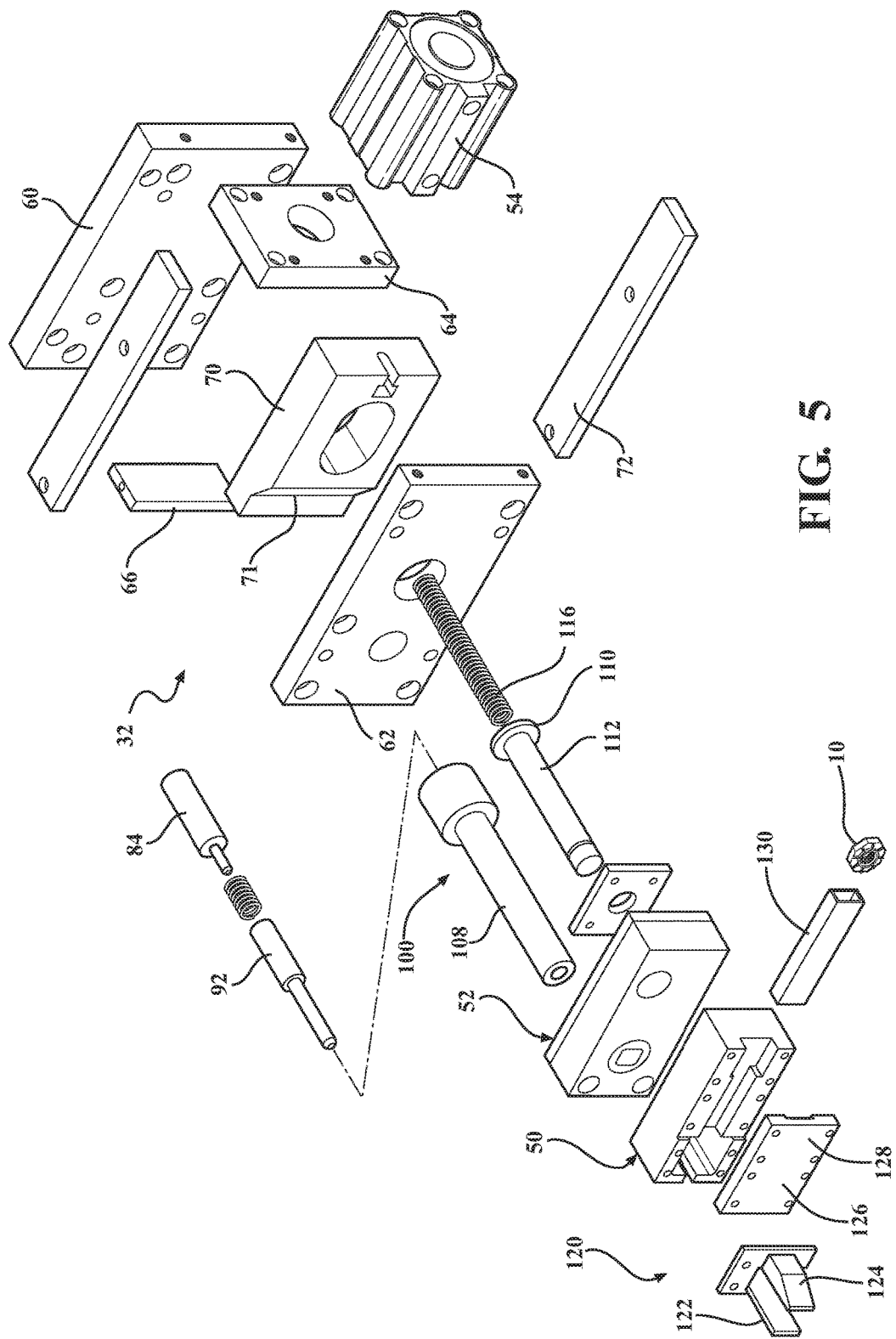
FIG. 5 is an exploded view of a pierce nut punch.

As shown in FIGS. 4, 5 and 6, the pierce nut tool 32 includes a pierce head body 50, a punch assembly 52 and a gag bar actuator 54.

A gag bar housing 53 includes a gag bar mounting plate cap 60 which is secured to a bottom plate 62 and an end plate 64 opposed from a front end plate 66 to form a housing surrounding a reciprocally movable gag bar 70. A side plate 72 (an opposite side plate is not shown) extends from the gag bar housing. The gag bar housing 53 has an open interior end to allow a piston from a pressurized gag bar cylinder to extend and retract the gag bar 70 relative to the gag bar housing 53, described hereinafter.

The punch assembly 52 is affixed to the bottom plate of the gag bar housing 53. As shown in detail in FIGS. 4 and 7, the punch assembly 52 includes a retainer punch guide plate 80 to which is mounted a backing plate 82 along one major surface. The backing plate 82 sandwiches a guide pin 84 is between it and the guide plate 80. The guide pin 84 is reciprocated by an extension and retraction of the gag bar 70 as described hereinafter. The guide pin 84 is mounted through aligned apertures in the guide plate 80 and the backing plate 82 so that one end of the guide pin 84 engages a cam surface on the bottom of the gag bar 70. The cam surface is sloped to allow the pin 84 to assume a withdrawn position shown in FIG. 7 and an extended position shown in FIG. 8.

A biasing element, such as a coil spring 90 is interposed between one end of the gag bar pin 84 and a slug kicker pin 92 which is mounted in a guide assembly 100 shown in detail in FIG. 6. Spring 93 acts as a return spring when the pin is advanced.

Figure 7:
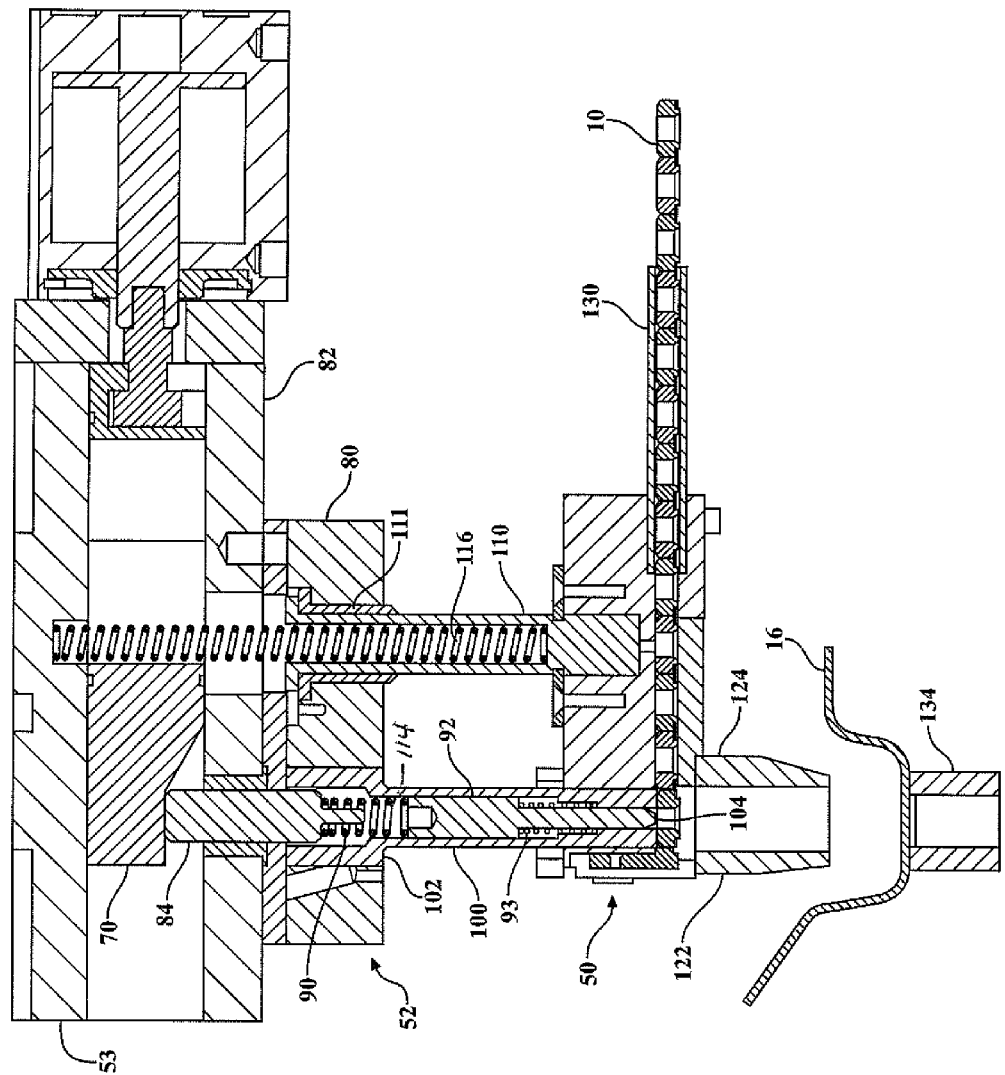
FIG. 7 is a sectional view of a pierce nut installation tool in an open position with pierce nuts fed into position for installation in a workpiece supported by a die and a gag bar in a retracted position.

The guide pin 84 and the coil spring 90 can be replaced by an elongated, solid, one-piece slug kicker pin if desired. The slug kicker pin 84, 92 is advanced vertically by the gag bar 70. The initial "open" position is shown in FIG. 7. The spring 93 supplies sufficient force to move the slug kicker pin 91 upward after a slug has been removed from the production part, but only after the gag bar moves back to the position shown in FIG. 7.

The guide assembly 100 has an enlarged upper end 102 with an opening extending to a hollow interior which receives one end of the coil spring 90 and one end of the guide pin 84. The other end of the coil spring 90 extends through the shaft portion of the guide assembly 100 to engage one end of the slug kicker pin 92, with a slug contact distal end extendably and retractably movable through an aperture in one end of a shaft portion 108 of the guide assembly 100.

Referring back to FIG. 5, the pierce head body 50 is fixedly mounted about the shaft 108 of the guide assembly 100 to receive the slug kicker pin 92 reciprocatingly therethrough. The pierce head body 50 is fixed to a stripper assembly 120 including first and second finger like strippers 122 and 124, or a collet assembly, which form an aperture at one end of a two part lower track formed of lower track 126 and lower track 128 which are affixed to the pierce head body 50.

Another guide shaft 110 is mounted in parallel to the assembly 100 to stabilize the assembly 52. This shaft has an enlarged flanged end mounted in a sleeve 111 in another aperture in the punch assembly 52. The guide shaft 110 is affixed between the punch assembly 52 and the pierce head body 50. The shaft 110 supports one of an interiorly disposed coil-type return spring or, alternatively, a column of Belleville washers and/or an exteriorly mounted coil spring 116. The coil spring 116 is seated between the guide pin 110 and the pierce head body 50.

Figure 8:
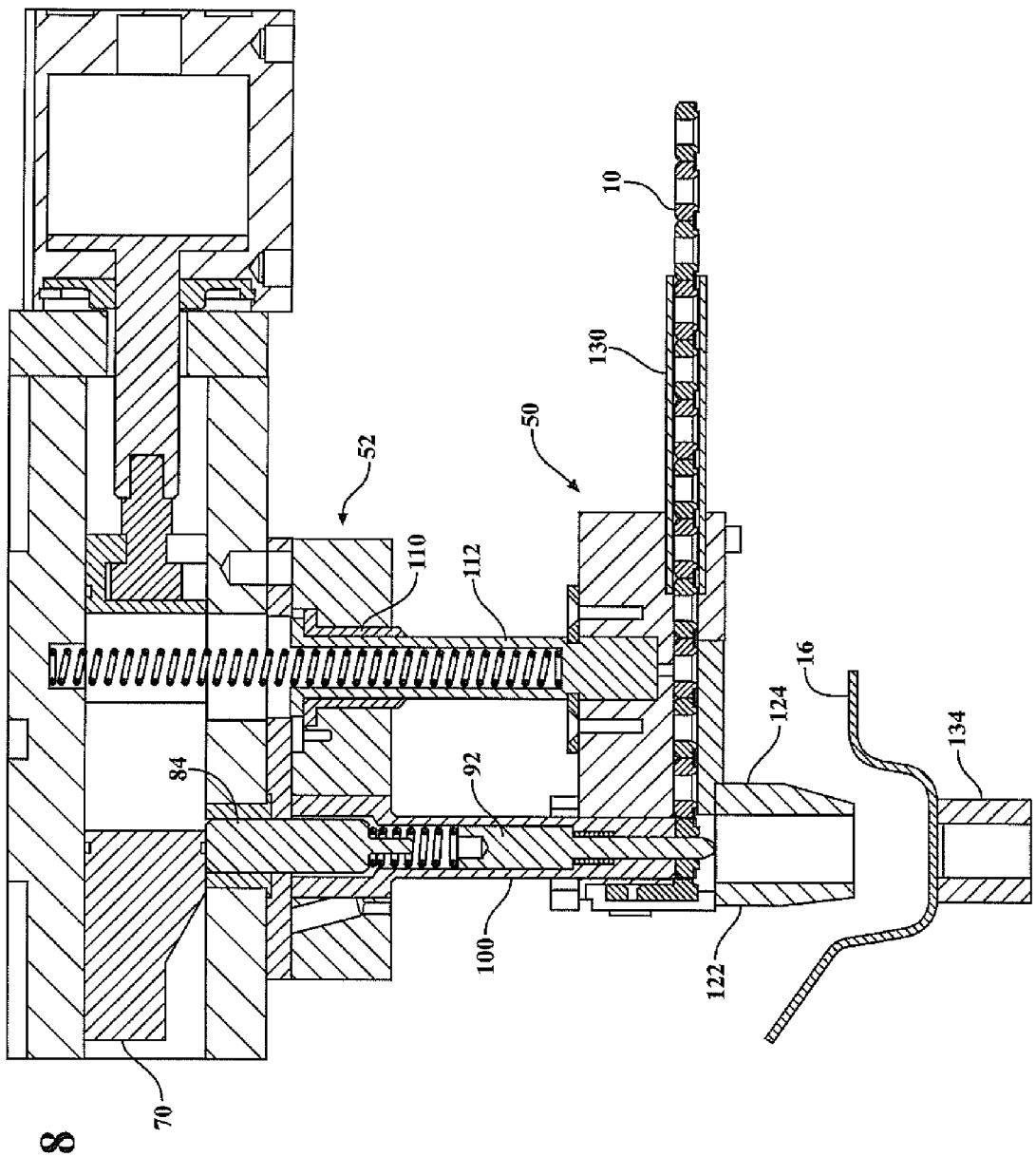
FIG. 8 shows the tool of FIG. 7 with the slug kicker pin advanced into a pierce nut by lateral displacement of the gag bar to an active position.
Figure 9:
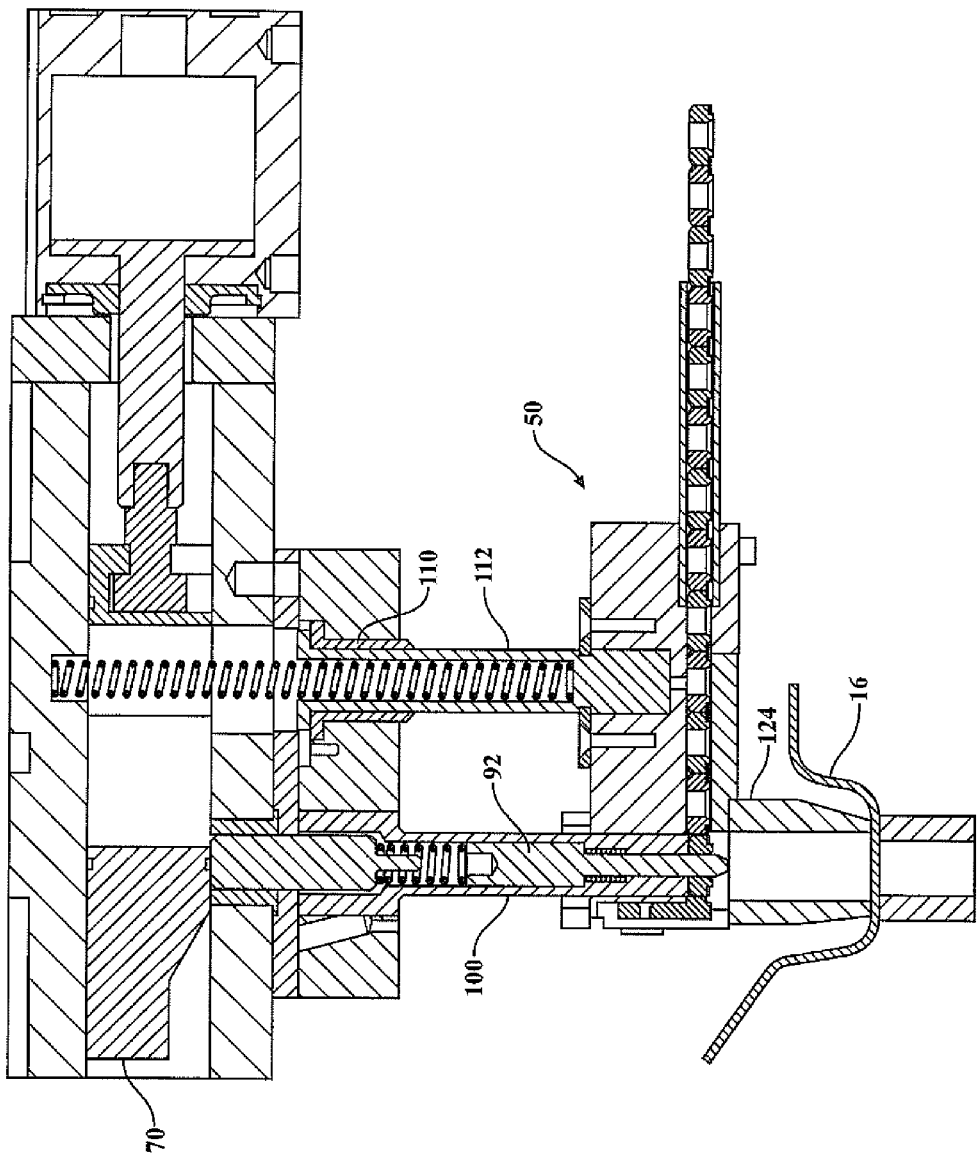
FIG. 9 shows the apparatus of FIGS. 7 and 8 with the gag bar still in the active position and the tool advanced into contact with the workpiece.

Pierce nuts 10 are successively moved from right to left as shown, for example, in FIG. 7, through a track 130 formed above the lower tracks 126 and 128 and the bottom surface of the pierce head body 50 as shown in FIGS. 7-9. A nut pusher moves a column of pierce nuts 10 through the track 130 past the guide pin 110 and into the jaw gripper.

FIG. 7 depicts the position of the components of the pierce nut assembly in an open position wherein one pierce nut 10 has been loaded into and beneath the slug kicker pin 92 in the pierce head body 50. In this open position, the slug kicker pin 92 is spaced above pierce nut 10. The springs 90, 114 and 116 are in an open, non-compressed position.

Next, as shown in FIG. 8, the gag bar 70 is extended via an extension of a piston in the gag bar actuator 54. A ramp or cam surface 71 on the gag bar 70 forces the guide pin 84 downward compressing a light spring 93 and forcing the end 104 of the slug kicker pin 92 into and at least partially through the aperture in the pierce nut 10. The pierce nut assembly remains in the open position with the springs 90 and 116 in a non-compressed state.

In the next step shown in FIG. 9, the entire pierce nut assembly 20 is urged by the ram 26 toward the workpiece 16 supported on a die 134 on the stand 22 compressing the spring 114 or 116 to start compressing spring 116.

As shown in FIG. 9, with the ram 26 stroked toward the production part 16, the strippers 122 and 124 are brought into engagement with the production part 16 supported on the die 134.

Figure 10:
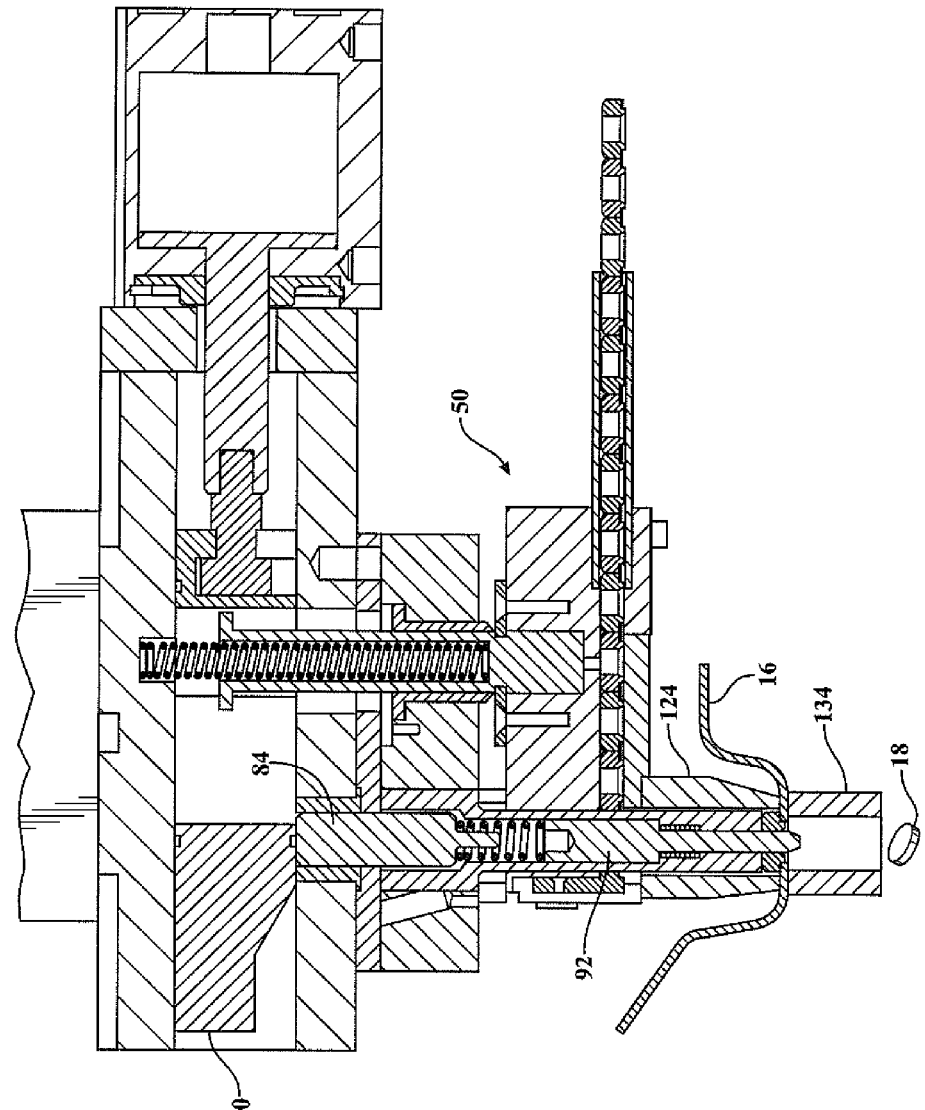
FIG. 10 shows the apparatus of FIGS. 7-9 with the gag bar still in the active position and the tool advanced to drive a pierce nut into the workpiece and receive a slug of material therefrom.

Finally, in FIG. 10, the ram 26 is fully extended bringing the entire pierce nut assembly to its full downward position; while the strippers 122 and 124 remain in engagement with the workpiece 16.

At the same time, the shaft 108 engages the pierce nut 10 forcing the conical pilot portion of the pierce nut through the metal of the workpiece 16 and into fixed engagement with the top surface of the workpiece 16 fixedly attaching the pierce nut 10 to the workpiece 16 while at the same time separating the slug 18 from the production part 16. The pin 84 fully compresses the spring 90 and urges the slug kicker pin 92 to its full extended position in which the end 104 of the slug kicker pin 92 extends through the aperture in the nut 10 and the aperture in the workpiece 16 to fully separate and eject the slug 18 from the workpiece 16.

After completion of the pierce operation shown in FIG. 10, the ram 26 retracts reversing the sequence of operation described in FIGS. 7-9. Retraction of the gag bar 70 allows the spring 90 to expand and enabling the spring 93 surrounding the slug kicker pin 92 to urge the slug kicker pin 92 back to the open position for the next load sequence of a pierce nut 10. The springs 114 and 116 expand to allow the pierce assembly 52 to also return to the open position allowing insertion of the next pierce nut 10 into the load position in the pierce assembly 52.

The preferred sequence of operations is to actuate the gag bar 70 to extend the kicker pin fully into and through the nut bore before driving the nut collar into the workpiece. This has the advantage of ensuring, via a limit switch or the like, that the nut has been loaded and is in the proper position before the install stroke, and has not been moved out of position by the kicker pin extension. It also gives the slug some momentum as the pierce takes place; i.e., the pin actually hits the workpiece just before the collar hits. Alternatively, the pin can be extended by actuation of the gag bar 70 during the extension of the punch assembly or even after the pierce step has started. The independent drives for the gag bar and the ram make these variations in sequence possible.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of installing pierce nuts into a solid metal workpiece wherein the pierce nut has a nut body, a pilot collar on one surface and an axial bore through the body of the pilot collar, the method comprising the steps of:
    a. placing a pierce nut in a punch in an initial position so that the nut is aligned with but out of contact with an installation location in a workpiece;
    b. using a gag bar to drive a slug kicker pin through the nut bore while continuing to hold the nut in an out-of-contact position;
    c. driving the punch and the kicker pin toward the workpiece until the pilot collar and the slug kicker pin extend though the workpiece so as to install the pilot collar into the workpiece, forming a slug from the workpiece and separating the slug from the workpiece using the kicker pin and, thereafter,
    d. withdrawing the punch and the kicker pin from the installed nut to allow another nut to be put into said initial position.

2. The method defined in claim 1 wherein the step of driving the slug kicker pin through the nut bore is performed by a gag bar having a cam surface which engages an end of the kicker pin and wherein the gag bar is reciprocally displaced by an actuator.

3. The method as defined in claim 1 wherein the pilot collar has an axial thickness approximately equal to or less than the thickness of the workpiece.

4. An apparatus for installing a pierce nut having an integral collar portion coaxially surrounding a threaded nut bore in a workpiece comprising:
    means for holding a pierce nut in an initial position which is aligned with but out of contact with an installation location in the workpiece and a die supportingly below the workpiece;
    a punch,
    a slug kicker pin extendable through the punch;
    a gag bar assembly located above the punch for reversibly driving the slug kicker pin through the punch and into the nut so as to extend through the nut bore;
    a ram for driving the nut and the kicker pin extended through the nut toward the workpiece far enough to drive the collar portion of the nut through the workpiece so as to install the collar portion of the nut into the workpiece while at the same time fully separating a slug of material from the workpiece and, using the kicker pin, driving the slug away from the workpiece.

5. A pierce nut installation assembly apparatus comprising:
    a gag bar having a cam surface attached to an actuator for reciprocating the gag bar;
    a punch assembly for holding pierce nuts with pilot collars in a location over but separated from an installation location in a solid metal workpiece;
    a slug kicker pin operatively connected to be reciprocated through the said location; said kicker pin engaging the gag bar cam surface; and
    a ram operating independent of the gag bar actuator for bringing the punch assembly and kicker pin to and in contact with a pierce nut to drive a pilot collar on the pierce nut through the workpiece forcing a slug to form in the workpiece corresponding to the configuration of the pilot collar.

6. Apparatus for installing pierce nuts of the type having pilot collar and a through bore and a pilot collar wherein the nuts are to be installed into a metal workpiece having installation locations, the apparatus comprising:
    means for feeding pierce nuts into an installation position out of contact with the workpiece but in alignment with an installation location in the workpiece;
    a slug kicker pin mounted for reciprocal movement toward and away from pierce nuts in the installation position;
    an actuator and a gag bar having a cam surface, the gag bar being connected to the actuator for reciprocal movement to extend and retract said slug kicker pin from a withdrawn position out of contact with a pierce nut to an extended position wherein the kicker pin extends fully through said bore; and
    ram means for reciprocating the actuator, kicker pin and a nut contact ram toward the workpiece with the kicker pin in the extended position to drive the pilot collar of a pierce nut through an installation location in the metal workpiece while simultaneously driving the kicker pin through the bore to fully separate a slug formed in the workpiece by the pilot collar during the installation step.

7. A pierce nut assembly apparatus comprising:
    a gag bar assembly affixed to a reciprocating ram, and carrying a movable gag bar;
    a pierce head coupled to the gag bar assembly;
    a guide carried in a guide assembly of the pierce head for engaging a pierce nut loaded in the pierce head and forcibly urging the pierce nut into fixed engagement with a workpiece during extension of said ram; and
    a biased slug kicker pin carried within the guide assembly and extendible through a bore in the pierce nut during extension of the ram to separate and eject a slug formed in the workpiece by engagement of the pierce nut with the workpiece.

8. The apparatus of claim 7 further comprising:
    a guide pin interposed and coupled between the gag bar and the slug kicker pin for extending the slug kicker pin relative to the pierce head during extension of the gag bar.

9. The apparatus of claim 8 further comprising:
    a biasing member interposed between the guide pin and the slug kicker pin.

10. The apparatus of claim 7 further comprising:
    a unitary slug kicker pin coupled to and reciprocating with reciprocating movement of the gag bar; and
    a biasing member interposed between the guide and slug kicker pin.

* * * * *